US012750269B2

(12) United States Patent
Yang et al.

(10) Patent No.: US 12,750,269 B2
(45) Date of Patent: *Sep. 29, 2026

(54) TRANSMITTING DEVICES THAT PROVIDE TRANSMISSION SIGNALS HAVING ENLARGED DATA EYES

(71) Applicant: Samsung Electronics Co., Ltd., Suwon-si (KR)

(72) Inventors: Seongyeal Yang, Suwon-si (KR); Moonchul Choi, Suwon-si (KR); Sungyong Cho, Suwon-si (KR); Jaehyeok Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

This patent is subject to a terminal disclaimer.

(21) Appl. No.: 18/945,640

(22) Filed: Nov. 13, 2024

(65) Prior Publication Data

US 2025/0071009 A1 Feb. 27, 2025

Related U.S. Application Data

(63) Continuation of application No. 18/327,306, filed on Jun. 1, 2023, now Pat. No. 12,170,589.

(30) Foreign Application Priority Data

Aug. 29, 2022 (KR) ........................ 10-2022-0108729
Nov. 3, 2022 (KR) ........................ 10-2022-0145510

(51) Int. Cl.
*H04L 27/36* (2006.01)

(52) U.S. Cl.
CPC .................................... *H04L 27/36* (2013.01)

(58) Field of Classification Search
CPC ..... H04L 25/03343; H04L 2025/03363; H04L 27/01; H04L 7/042; H04L 25/4917; G06F 13/4072; G06F 13/4234; H04B 10/504; H04B 10/451; H04B 14/023
USPC .......................................................... 375/298
See application file for complete search history.

(56) References Cited

U.S. PATENT DOCUMENTS 9,614,511 B2 4/2017 Blecher
10,530,617 B2 1/2020 Lin
2003/0108092 A1 6/2003 Gorecki et al.
(Continued)

FOREIGN PATENT DOCUMENTS

KR 102305915 B1 9/2021

*Primary Examiner* — Khai Tran
(74) *Attorney, Agent, or Firm* — Wolf, Greenfield & Sacks, P.C.

(57) ABSTRACT

Provided is a transmitting device for enlarging the size of a data eye of a transmission signal. The transmitting device includes an output driver including a plurality of driver circuits that drive a plurality of multi-level signals onto an output node, and a logic circuit configured to detect a direction of a pull-up or pull-down operation of each of the plurality of driver circuits by transitions of the plurality of driver control signals and generate pulse signals. The plurality of multi-level signals are driven based on a plurality of driver control signals and pulse signals, respectively, and the logic circuit provides a pulse signal to at least one static driver circuit connected to a driver control signal that does not transition, from among the plurality of driver circuits.

13 Claims, 14 Drawing Sheets

(56) References Cited

U.S. PATENT DOCUMENTS

| | | | | |
|---|---|---|---|---|
| 2006/0170451 | A1* | 8/2006 | Jordanger | H03K 19/00346 326/34 |
| 2015/0222366 | A1 | 8/2015 | Asmanis et al. | |
| 2016/0218859 | A1 | 7/2016 | Hoshyar et al. | |
| 2017/0212695 | A1* | 7/2017 | Hollis | G06F 13/4072 |
| 2019/0044762 | A1 | 2/2019 | Lin | |
| 2019/0332279 | A1 | 10/2019 | Hollis et al. | |
| 2020/0136866 | A1 | 4/2020 | Dong | |
| 2022/0021567 | A1 | 1/2022 | Hollis et al. | |
| 2025/0071009 | A1* | 2/2025 | Yang | H04L 27/36 |
| 2025/0392292 | A1* | 12/2025 | Kitamura | H03K 5/003 |

* cited by examiner

FIG. 2

200

| | d[0:1] | d[2:3] | d[4:5] | d[6:7] | d[8:9] | d[10:11] | d[12:13] | d[14:15] |
|---|---|---|---|---|---|---|---|---|
| DQ[0] | d0[0] | d0[7:1] | | | d0[8] | d0[15:9] | | |
| DQ[1] | d1[0] | d1[7:1] | | | d1[8] | d1[15:9] | | |
| DQ[2] | d2[0] | d2[7:1] | | | d2[8] | d2[15:9] | | |
| DQ[3] | d3[0] | d3[7:1] | | | d3[8] | d3[15:9] | | |
| DQ[4] | d4[0] | d4[7:1] | | | d4[8] | d4[15:9] | | |
| DQ[5] | d5[0] | d5[7:1] | | | d5[8] | d5[15:9] | | |
| DQ[6] | d6[0] | d6[7:1] | | | d6[8] | d6[15:9] | | |
| DQ[7] | d7[0] | d7[7:1] | | | d7[8] | d7[15:9] | | |

USER DATA 202

BB

| | s[0] | s[1] | s[2] | s[3] | s[4] | s[5] | s[6] | s[7] |
|---|---|---|---|---|---|---|---|---|
| DQ[0] | c0[7:0] | | | | c0[15:8] | | | |
| DQ[1] | c1[7:0] | | | | c1[15:8] | | | |
| DQ[2] | c2[7:0] | | | | c2[15:8] | | | |
| DQ[3] | c3[7:0] | | | | c3[15:8] | | | |
| DQ[4] | c4[7:0] | | | | c4[15:8] | | | |
| DQ[5] | c5[7:0] | | | | c5[15:8] | | | |
| DQ[6] | c6[7:0] | | | | c6[15:8] | | | |
| DQ[7] | c7[7:0] | | | | c7[15:8] | | | |
| DBI | d0[0]<br>d1[0] | d2[0]<br>d3[0] | d4[0]<br>d5[0] | d6[0]<br>d7[0] | d0[8]<br>d1[8] | d2[8]<br>d3[8] | d4[8]<br>d5[8] | d6[8]<br>d7[8] |

ENCODED DATA 204

| Symbol bit | | Symbol Level |
|---|---|---|
| 1 | 1 | +3 |
| 1 | 0 | +1 |
| 0 | 1 | −1 |
| 0 | 0 | −3 |

PAM−4 EYE DIAGRAM 400

Symbol Level [-3] → [+1]

| DRIVER CONTROL SIGNAL | PRESENT STATE | DRIVER OPERATION DIRECTION | NEXT STATE |
|---|---|---|---|
| A | 1 | STATIC | 1 |
| B | 1 | PULL-UP | 0 |
| C | 1 | PULL-UP | 0 |

Symbol Level [+3] → [−1]

| DRIVER CONTROL SIGNAL | PRESENT STATE | DRIVER OPERATION DIRECTION | NEXT STATE |
|---|---|---|---|
| A | 0 | PULL-DN | 1 |
| B | 0 | PULL-DN | 1 |
| C | 0 | STATIC | 0 |

Symbol Level [−1] ⟶ [+1]

| DRIVER CONTROL SIGNAL | PRESENT STATE | DRIVER OPERATION DIRECTION | NEXT STATE |
|---|---|---|---|
| A | 1 | STATIC | 1 |
| B | 1 | PULL-UP | 0 |
| C | 0 | STATIC | 0 |

Symbol Level [−3] → [−1]

| DRIVER CONTROL SIGNAL | PRESENT STATE | DRIVER OPERATION DIRECTION | NEXT STATE |
|---|---|---|---|
| A | 1 | STATIC | 1 |
| B | 1 | STATIC | 1 |
| C | 1 | PULL-UP | 0 |

TRANSMITTING DEVICES THAT PROVIDE TRANSMISSION SIGNALS HAVING ENLARGED DATA EYES

REFERENCE TO PRIORITY APPLICATIONS

This application is a continuation of and claims priority to U.S. patent application Ser. No. 18/327,306, filed Jun. 1, 2023, which claims priority under 35 U.S.C. § 119 to Korean Patent Application No. 10-2022-0108729, filed Aug. 29, 2022, and Korean Patent Application No. 10-2022-0145510, filed Nov. 3, 2022, the disclosures of which are hereby incorporated herein by reference.

BACKGROUND

The inventive concept relates to semiconductor devices and, more particularly, to transmission devices for enlarging the size of a data eye of a transmission signal, for improved reliability of data transmission.

Efforts to make computing systems more powerful and more power efficient develop interface communications, thereby improving throughput without increasing, and ideally reducing, power consumption. Some systems implement Pulse-Amplitude Modulation 4-Level (PAM-4) signaling. PAM-4 may be used to transform two bitstreams into a single multi-level signal (or symbol) having 4 levels (e.g., [−3], [−1], [+1], [+3], as shown by FIG. 3. PAM-4 signaling may employ maximum transition avoidance (MTA) coding for removing maximum voltage transitions between multi-level signals (e.g., [−3]→[+3], [+3]→[−3]) on a signal line. As will be understood by those skilled in the art, MTA coding may reduce inter-symbol interference (ISI) and crosstalk that can result in signal distortion.

In typical applications, PAM-4 signaling may be designed to maximize the size of an eye in a data eye diagram, when swings of signals transmitted at several multi-levels are superimposed. In a data eye diagram, such as shown by FIG. 4, the slope of a transition to an intermediate level (e.g., [−3]→[+1], [+3]→[−1]) may become gentler as the transition gets closer to a target multi-level, and thus the size of an intermediate eye may decrease. To increase the data eye, a driver that speeds up positive transition or negative transition may be added to a signal line. However, since an additional driver acts as a load like a capacitor on a signal line, there may be availability constraints for high data rates.

SUMMARY

The inventive concept provides a transmitting device that can enlarge the size of a data eye of a transmission signal, without requiring an additional driver.

According to an aspect of the inventive concept, there is provided a transmitting device including an output node, and an output driver including a plurality of driver circuits that drive a plurality of multi-level signals onto the output node. The plurality of multi-level signals are driven based on a plurality of driver control signals and pulse signals associated with the plurality of driver control signals, respectively. A logic circuit is provided, which is configured to detect a direction of a pull-up or pull-down operation of each of the plurality of driver circuits based on transitions of the plurality of driver control signals, and generate the pulse signal. The logic circuit may also provide the pulse signal to at least one static driver circuit connected to a driver control signal that does not transition, from among the plurality of driver circuits.

According to another aspect of the inventive concept, there is provided a transmitting device including an output node, an encoder configured to encode (n−1) bitstreams, where n is an integer equal to or greater than 3. The encoder converts the (n−1) bitstreams into n driver control signals, which include first to n-th driver control signals. The first to n-th driver control signals are configured to sequentially transition one-by-one with respect to the (n−1) bitstreams, and include a driver control signal that does not transition. An output driver is provided, which includes a plurality of driver circuits that drive a plurality of multi-level signals onto the output node. The plurality of multi-level signals are driven based on the first to n-th driver control signals and pulse signals associated with the first to n-th driver control signals, respectively. In some embodiments of the inventive concept, the multi-level signals have $2^{(n-1)}$ levels, and a logic circuit is provided, which is configured to detect a direction of a pull-up or pull-down operation of each of the plurality of driver circuits based on transitions of the first to n-th driver control signals, and generate the pulse signal. The logic circuit provides the pulse signal to at least one static driver circuit connected to the driver control signal that does not transition, from among the plurality of driver circuits.

According to another aspect of the inventive concept, there is provided a method of operating a transmitting device. The method includes converting a plurality of bitstreams into a plurality of driver control signals by using an encoder. The plurality of driver control signals are configured to sequentially transition one-by-one with respect to the plurality of bitstreams, and include a driver control signal that does not transition. An operation is also performed to detect a transition of each of the plurality of driver control signals by using a logic circuit, and then generating, by using the logic circuit, a certain pulse signal from the transition of each of the plurality of driver control signals. Then, using the logic circuit, the pulse signal is provided to at least one static driver circuit connected to the driver control signal that does not transition, from among a plurality of driver circuits connected to an output node of the transmitting device.

BRIEF DESCRIPTION OF THE DRAWINGS

Embodiments of the inventive concept will be more clearly understood from the following detailed description taken in conjunction with the accompanying drawings in which:

FIG. 2 is a diagram for describing 7-8 bit encoding used in a PAM-4 encoder of FIG. 1;

DETAILED DESCRIPTION OF THE EMBODIMENTS

Figure 1:
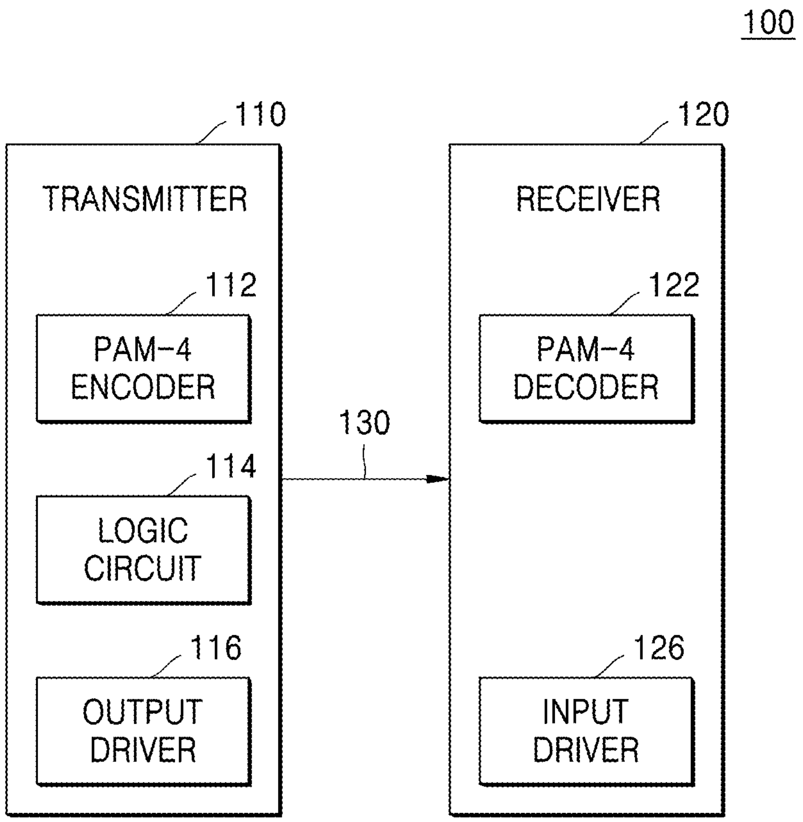
FIG. 1 is a block diagram showing an apparatus including a transmitter and a receiver according to embodiments.

FIG. 1 is a block diagram showing an apparatus including a transmitter and a receiver according to embodiments. Referring to FIG. 1, an apparatus 100 may include a transmitter 110 and a receiver 120. The apparatus 100 may represent an integrated circuit, an electronic device or system, a smart phone, a tablet PC, a computer, a server, a workstation, a portable communication terminal, a personal digital assistant (PDA), a portable multimedia player (PMP), a computing device like other suitable computers, a virtual machine, or a virtual computing device thereof. Alternatively, the apparatus 100 may be a part of components included in a computing system (e.g., a graphics card). The present embodiment shows a number of conceptual hardware components included in the apparatus 100. However, the inventive concept is not limited thereto, and other components may be provided. The transmitter 110 may be referred to as a transmitting device, and the receiver 120 may be referred to as a receiving device.

The transmitter 110 may communicate with the receiver 120 through a channel 130. The channel 130 includes a plurality of signal lines that physically or electrically interconnect the transmitter 110 and the receiver 120. The transmitter 110, the receiver 120, and the channel 130 may support PAM-4 signaling for converting 2-bit streams into a single multi-level signal having 4 levels. For example, the transmitter 110 may include a PAM-4 encoder 112 that converts data bursts to be transmitted to the receiver 120 into PAM-4 symbols. The PAM-4 encoder 112 may perform encoding on data bursts, thereby generating PAM-4 symbols. The PAM-4 encoder 112 collectively refers to those implemented in hardware, firmware, software, or a combination thereof for constituting an encoding circuit. The transmitter 110 may further include an output driver 116 for outputting PAM-4 symbols to the channel 130. The transmitter 110 may transmit PAM-4 symbols to the receiver 120 through the channel 130. Hereinafter, PAM-4 symbols may be interchangeably referred to as multi-level signals.

The PAM-4 encoder 112 may include a look-up table implemented by registers (or storage elements) for storing correlations between data bursts and PAM-4 symbols. The PAM-4 encoder 112 may use the look-up tables to convert data bursts into PAM-4 symbols. PAM-4 symbols may be transmitted through the channel 130 by the output driver 116.

The receiver 120 may include an input driver 126 that receives PAM-4 symbols through the channel 130 and a PAM-4 decoder 122 that decodes received PAM-4 symbols. The PAM-4 decoder 122 may decode and recover PAM-4 symbols into data bursts of 2-bit streams. The PAM-4 decoder 122 collectively refers to those implemented in hardware, firmware, software, or a combination thereof for constituting a decoding circuit. The PAM-4 decoder 122 may include a look-up table implemented by registers (or storage elements) for storing correlations between PAM-4 symbols and data bursts. The PAM-4 decoder 122 may use look-up tables to recover PAM-4 symbols into data bursts. Look-up tables of the PAM-4 decoder 122 may be configured identically to look-up tables of the PAM-4 encoder 112.

Figure 7:
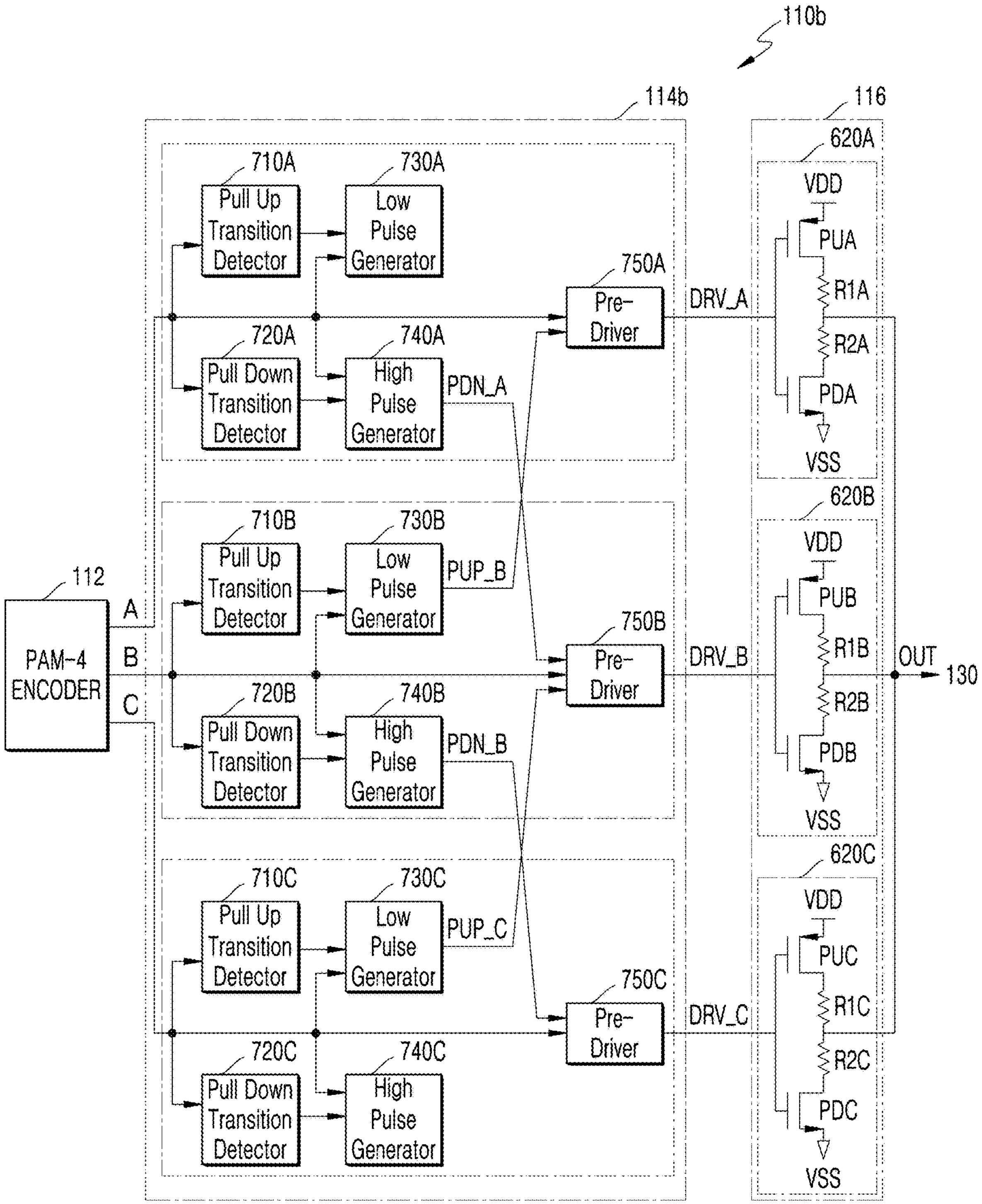

FIG. 2 is a diagram for describing 7-8 bit encoding used in the PAM-4 encoder 112 of FIG. 1. Referring to FIG. 2, 7-8 bit encoding 200 between user data 202 and encoded data 204 is shown. The user data 202 may be referred to as raw data. For the user data 202 and the encoded data 204, each row DQ[i] represents serial data.

In the user data 202, 16-bit data bursts are constructed on each DQ[i] serial data line, and columns include sequential 2-bit positions within the 16-bit data bursts. For example, a second bit and a third bit of each data burst are represented by a column label d [2:3]. Each 16-bit data burst is represented by two ½ data bursts of 8 bits each. For example, on a serial data line DQ[0], a 16-bit data burst is divided into a first ½ data burst d0[0]d0[7:1] and a second ½ data burst d0[8]d0[15:9]. Each ½ data burst is further divided into a 1-bit: 7-bit pair. For example, on the serial data line DQ[0], the first ½ data burst d0[0]d0[7:1] is divide into a 1-bit value d0[0] and a 7-bit value d0[7:1].

In the encoded data 204, DQ[i] rows represent serial data lines, a DBI row represents a data bus inversion (DBI) signal line, and the DQ[i] rows and the DBI row may be included in the plurality of signal lines of the channel 130 (FIG. 1). In the encoded data 204, columns are bit strings representing symbols s[i]. For example, s[0] represents a first 2-bit PAM4 symbol on each serial data line, and s[1] represents a second 2-bit PAM4 symbol on each serial data line.

The 7–8 bit encoding 200 may encode a pair of 1-bit data values of different serial data lines into a PAM-4 symbol on the DBI signal line. For example, data d0[0] of the serial data line DQ[0] and data d1 [0] of a serial data line DQ[1] are encoded into a 2-bit PAM-4 symbol on the DBI signal line. Similarly, data d2 [0] of a serial data line DQ[2] and data d3 [0] of a serial data line DQ[3] are encoded into a 2-bit PAM-4 symbol on the DBI signal line.

According to embodiments, in the 7–8 bit encoding 200, a 2-bit PAM-4 symbol on the DBI signal line may be a result of encoding a pair of 1-bit data values each at any bit position of one serial data line into a PAM-4 symbol on the DBI signal line. For example, data d0[0] and d0[8] of the serial data line DQ[0] may be encoded into 2-bit PAM-4 symbols on the DBI signal line, and data d1 [0] and d1 [8] of the serial data line DQ[1] may be encoded into a 2-bit PAM-4 symbol on the DBI signal line.

In the 7–8 bit encoding 200, the remaining 7 bits of each ½ data burst not used as PAM-4 symbols on the DBI signal line are encoded into 4 PAM-4 symbols on a corresponding serial data line. The 4 PAM-4 symbols include 8 bits and may be referred to as a codeword. For example, data d0[7:1] is encoded into a codeword c0[7:0] on the serial data line DQ[0]. A codeword for each 7 bits of data d0[7:1] may be represented by 4 PAM-4 symbols. The data d0[7:1] is encoded into the codeword c0[7:0] including PAM-4 symbols s[0], s[1], s[2], and s[3]. The PAM-4 symbols s[0], s[1], s[2], and s[3] may each include two bitstreams and may be represented in 4 symbol levels, as shown in FIG. 3, which illustrates a non-limiting example for describing mapping between PAM-4 symbols and symbol bits.

Figures 3, 4:
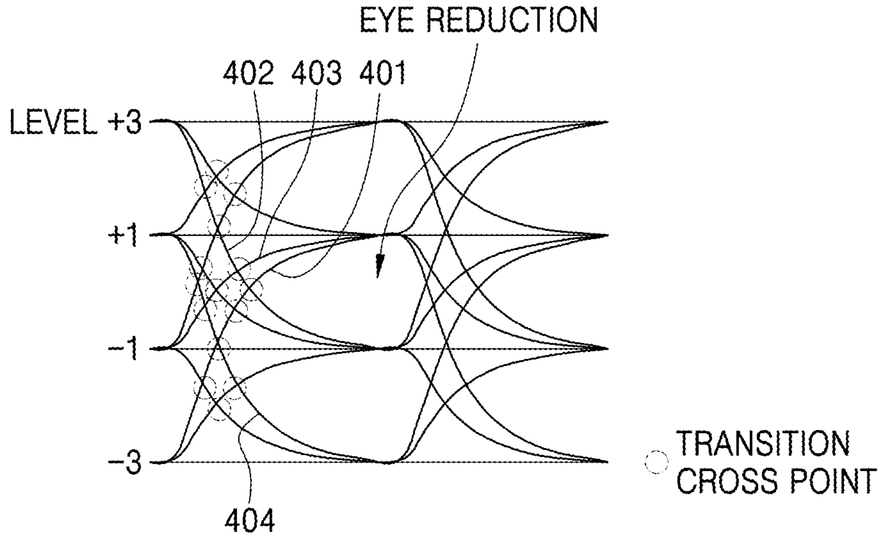
FIG. 3 is a diagram for describing PAM-4 symbol levels for two bitstreams.
FIG. 4 is a diagram for describing an example PAM-4 eye diagram.

Referring to FIG. 3, a 2-bit PAM-4 symbol may be transmitted to a signal line of the channel 130 (FIG. 1) at four symbol levels respectively indicated by levels −3, −1, +1, and +3. The four symbol levels may have four current levels by the output driver 116 (FIG. 1), respectively. For example, the PAM-4 symbol of a level +3 may be represented by a symbol bit 11 and may be set to have the highest current level and the highest voltage level. A PAM-4 symbol of a level +1 may be represented by a symbol bit 10 and may be set to have a current level and a voltage level lower than those of the PAM-4 symbol of the level +3. A PAM-4 symbol of a level −1 may be represented by a symbol bit 01 and may be set to have a current level and a voltage level lower than those of the PAM-4 symbol of the level +1. A PAM-4 symbol of a level −3 may be indicated by a symbol bit 00 and may be set to have the lowest current level (e.g., zero current level) and the lowest voltage level. Therefore, the PAM-4 symbol of the level +3 may be set to exhibit the highest power consumption, and the PAM-4 symbol of the level −3 may be set to exhibit the lowest power consumption.

In the 7-8 bit encoding 200 of FIG. 2, MTA coding may be provided to prevent occurrence of an MT event from the level −3 to the level +3 or from the level +3 to the level −3 between symbols s[0], s[1], s[2], and s[3] within a codeword ci[7:0] regarding 7 bits of a first ½ data burst on each DQ[i] serial data line. MTA coding may be provided to prevent occurrence of an MT event from the level −3 to the level +3 or from the level +3 to the level −3 between symbols s[4], s[5], s[6], and s[7] within a codeword ci[15:8] regarding 7 bits of a second ½ data burst. The boundary between the codeword ci[7:0] regarding 7 bits of the first ½ data burst on each DQ[i] serial data line and the codeword ci[15:8] regarding 7 bits of the second ½ data burst on each DQ[i] serial data line may be referred to as a block boundary BB. A codeword inversion scheme may be applied to the block boundary BB to prevent an MT event between the last symbol of a current codeword and the first symbol of a next codeword.

For example, when levels of previous codeword symbols are {−3, +1, −1, +3} and levels of current codeword symbols are {−3, +1, −3, +1}, an MT event occurs from the level +3 of the last symbol s[3] of the previous codeword symbols to the level −3 of the first symbol s[1] of the current codewords, and thus the codeword inversion scheme is configured to output inverted codeword symbols {+3, 1, +3, −1} by inverting the current codeword symbols {−3, +1, −3, +1}. At this time, the receiver 120 may receive the current codeword including the inverted codeword symbols {+3, −1, +3, −1}, determine whether to invert the same, and generate current codeword symbols {−3, +1, −3, +1} by inverting the same based on a result of the determination. Therefore, data invariance of signals transmitted between the transmitter 110 and the receiver 120 may be maintained.

FIG. 4 is a diagram for describing an example PAM-4 eye diagram 400. PAM-4 eye diagrams described below are usually plotted as voltages on a signal line against time at the receiver 120, wherein the vertical axis represents voltages and the horizontal axis represents the time in which time intervals like two symbol intervals overlap each other. However, it should be noted that they are not necessarily drawn to scale.

Referring to FIG. 4, in the PAM-4 eye diagram 400, several cross points (e.g., small circle marks) may be seen due to transitions to several symbol levels. From among several cross points, a cross point on a transition waveform 401 from a symbol level −3 to a symbol level +1 and a cross point on a transition waveform 402 from a symbol level +3 to a symbol level −1 exhibit the slowest characteristics. Also, a cross point on a transition waveform 403 from the symbol level −1 to the symbol level +1 and a cross point on a transition waveform 404 from the symbol level −3 to the symbol level −1 also exhibit slow characteristics. Overall, it may be seen that the transition slope becomes gentler toward target symbol levels +1 and −1. Therefore, the size of the intermediate eye shown by transition waveforms 401, 402, 403, and 404 to intermediate symbol levels +1 or −1 may be reduced.

Figure 5:
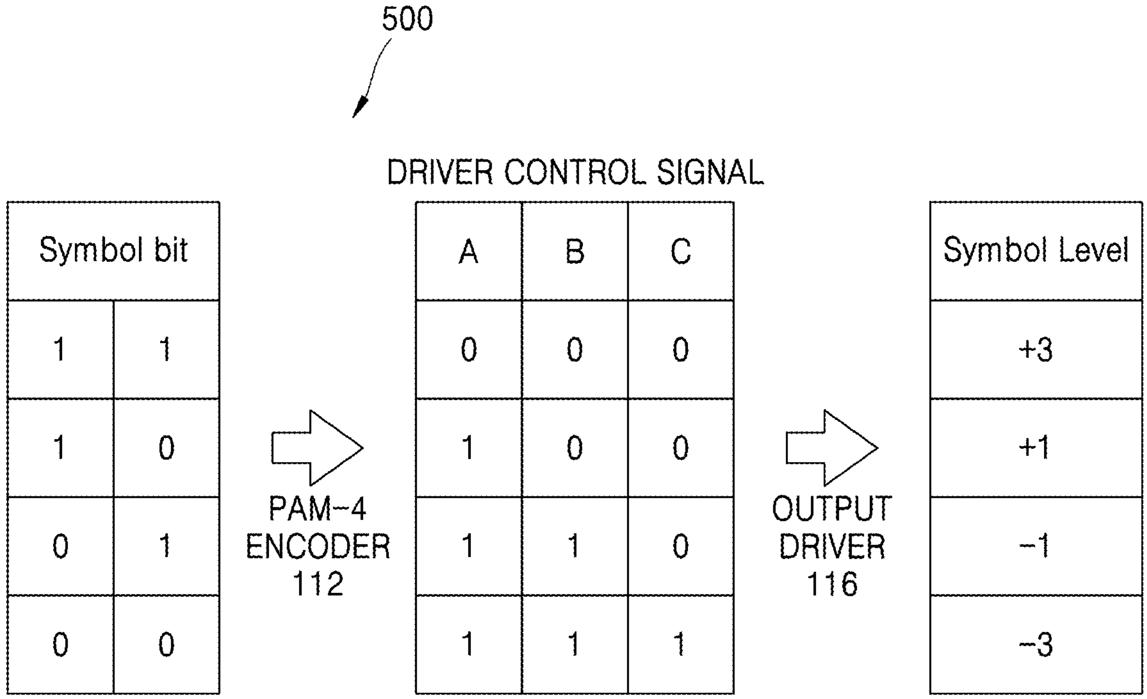
FIG. 5 is a diagram for describing an encoding map for encoding two bitstreams to a PAM-4 symbol level according to embodiments.

Hereinafter, an encoding map for two bitstreams of PAM-4 symbols for enlarging the intermediate eye in the PAM-4 eye diagram 400 will be described with reference to FIG. 5. FIG. 5 shows a non-limiting example for explanatory purposes. In particular, FIG. 5 is a diagram for describing an encoding map for encoding two bitstreams on one signal line to a PAM-4 symbol level according to embodiments.

Referring to FIGS. 1 and 5, an encoding map 500 may map PAM-4 symbol bits of two bitstreams to three driver control signals A, B, and C through the PAM-4 encoder 112. For example, when the logic value of the two bitstreams is 00, driver control signals A, B, and C may be mapped to the logic value of 1. When the logic value of the two bitstreams is 01, driver control signals A and B may be mapped to the logic value of 1 and a driver control signal C may be mapped to the logic value of 0. When the logic value of the two bitstreams is 10, a driver control signal A may be mapped to the logic value of 1 and driver control signal B and C may be mapped to the logic value of 0. When the logic value of the two bitstreams is 11, the driver control signals A, B, and C may be mapped to the logic value of 0.

The driver control signals A, B, and C may be used by the output driver 116 to drive a voltage corresponding to one of four PAM-4 symbol levels −3, −1, +1, and +3 to the channel 130 connected to an output node of the transmitter 110. The output driver 116 may drive symbol levels based on the logic value of each of the driver control signals A, B, and C.

Figure 6:
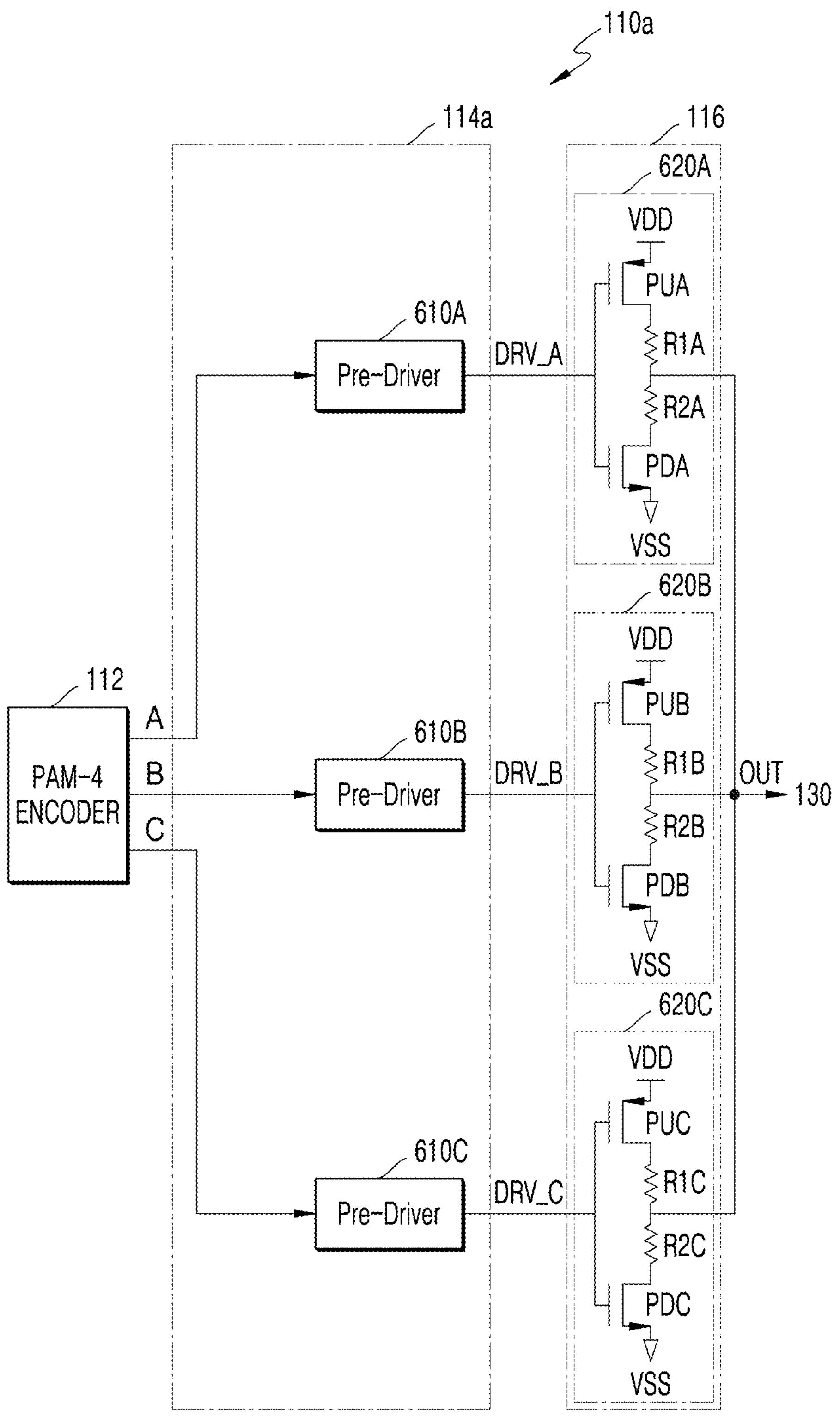
FIGS. 6 and 7 are block diagrams for describing a transmitter according to embodiments.

FIGS. 6 and 7 are block diagrams for describing a transmitter according to embodiments. FIG. 6 is a diagram for describing a transmitter 110*a* using the encoding map 500 of FIG. 5. FIG. 7 is a diagram for describing a transmitter 110*b* using the encoding map 500 of FIG. 5, a pull-up pulse signal, and a pull-down pulse signal. Hereinafter, subscripts attached to reference numerals (e.g., a of 110*a* and *b* of 110*b*, a of 114*a* and *b* of 114*b*, A of 610A, B of 610B, and C of 610C) are used to distinguish multiple circuits that perform the same function. For convenience of explanation, the driver control signals A, B, and C may be used interchangeably as first to third driver control signals, respectively.

Referring to FIG. 6, in the transmitter 110*a*, the PAM-4 encoder 112 may provide first to third driver control signals A, B, and C by using the encoding map 500 of FIG. 5. The transmitter 110*a* may include a logic circuit 114*a* and the output driver 116. The logic circuit 114*a* may include a first pre-driver circuit 610A connected to a first driver control signal A, a second pre-driver circuit 610B connected to a second driver control signal B, and a third pre-driver circuit 610C connected to a third driver control signal C. First to third pre-driver circuits 610A, 610B, and 610C may output first to third drive signals DRV_A, DRV_B, and DRV_C having the same signal waveforms as those of the first to third driver control signals A, B, and C, respectively.

The output driver 116 may include a first driver circuit 620A receiving a first drive signal DRV_A, a second driver circuit 620B receiving a second drive signal DRV_B, and a third driver circuit 620C receiving a third drive signal DRV_C. First to third driver circuits 620A, 620B, and 620C may include pull-up transistors PUA, PUB, and PUC, first resistors R1A, R1B, and R1C, second resistors R2A, R2B, and R2C, and pull-down transistors PDA, PDB, and PDC, which are connected between a power voltage VDD and a ground voltage. In the first to third driver circuits 620A, 620B, and 620C, an output node OUT connected between the first resistors R1A, R1B, and R1C and the second resistors R2A, R2B, and R2C may be connected to the channel 130.

According to some embodiments, the first resistors R1A, R1B, and R1C and the second resistors R2A, R2B, and R2C may be configured to provide a termination resistance value to the channel 130 when the transmitter 110*a* transmits PAM-4 symbols to the channel 130. When the output impedance of a transmitting end and the impedance of a receiving end do not match, signal reflection is induced at the receiving end, and a reflected signal is not properly transmitted. As a result, the voltage level at the receiving end is changed, and thus signal transmission may not be performed properly. The first resistors R1A, R1B, and R1C and the second resistors R2A, R2B, and R2C may be used to adjust a termination resistance value, thereby providing impedance matching of the channel 130 and improving the signal integrity of signals transmitted and received through the channel 130.

In the first to third driver circuits 620A, 620B, and 620C, the pull-up transistors PUA, PUB, and PUC are enabled when the first to third drive signals DRV_A, DRV_B, and DRV_C have the logic value of 0 and disabled when the first to third drive signals DRV_A, DRV_B, and DRV_C have the logic value of 1, respectively. The pull-down transistors PDA, PDB, and PDC are enabled when the first to third drive signals DRV_A, DRV_B, and DRV_C have the logic value of 1 and disabled when the first to third drive signals DRV_A, DRV_B, and DRV_C have the logic value of 0.

For example, when the first to third drive signals DRV_A, DRV_B, and DRV_C have the logic value of 1, three pull-down transistors PDA, PDB, and PDC in the output driver 116 are enabled, and thus the output node OUT may be driven with the symbol level −3 having the lowest voltage level. When the first drive signal DRV_A and the second drive signal DRV_B have the logic value of 1 and the third drive signal DRV_C has the logic value of 0, two pull-down transistors PDA and PDB in the output driver 116 and 1 pull-up transistor PUC are enabled, and thus the output node OUT may be driven at the symbol level −1. When the first drive signal DRV_A has the logic value of 1 and the second drive signal DRV_B and the third drive signal DRV_C have the logic value of 0, 1 pull-down transistor PDA and two pull-up transistors PUB and PUC in the output driver 116 are enabled, and thus the output node OUT may be driven at the symbol level +1. When the first to third drive signals DRV_A, DRV_B, and DRV_C have the logic value of 0, three pull-up transistors PUA, PUB, and PUC in the output driver 116 are enabled, and thus the output node OUT may be driven with the symbol level +3 having the highest voltage level.

Figure 12:
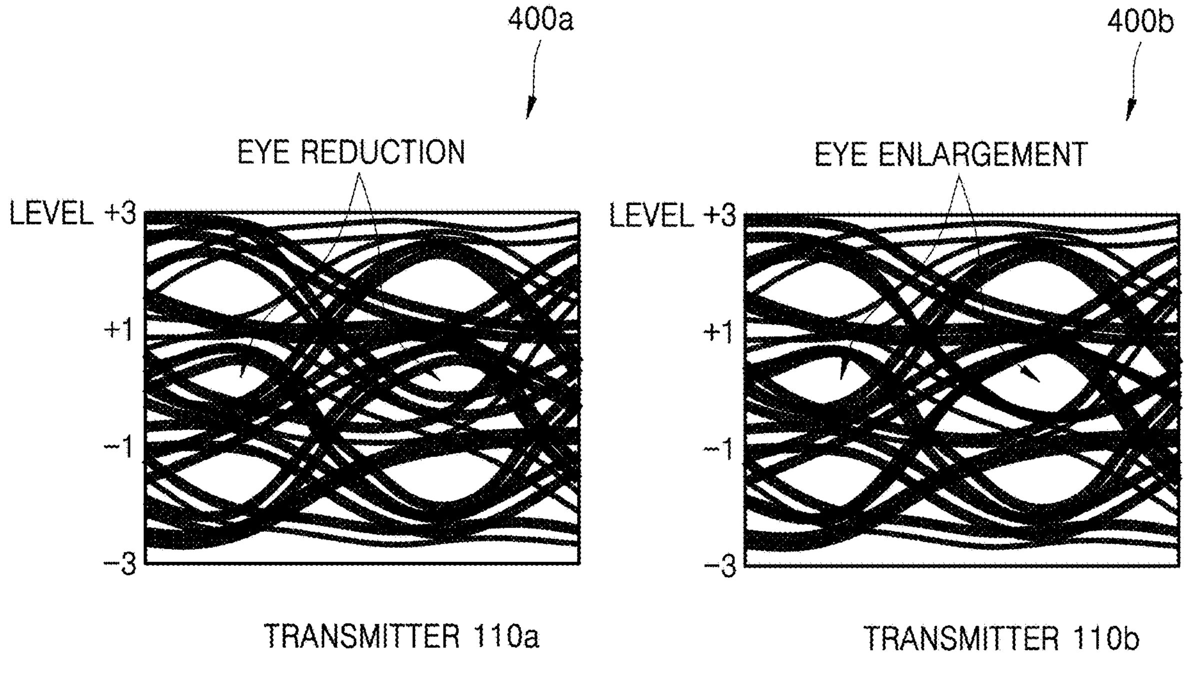
FIG. 12 is a diagram for describing PAM-4 eye diagrams according to embodiments.

The driver control signals A, B, and C having the logic value of 1 enable pull-down transistors to which the corresponding driver control signals are connected to start pull-down operations of the first to third driver circuits 620A, 620B, and 620C, respectively, wherein a high-level driver control signal may act as a pull-down control signal instructing pull-down of a driver circuit operation. The driver control signals A, B, and C having the logic value of 0 enable pull-up transistors to which the corresponding driver control signals are connected to start pull-up operations of the first to third driver circuits 620A, 620B, and 620C, respectively, wherein a low-level driver control signal may act as a pull-up control signal instructing pull-up of a driver circuit operation. Advantageously, based on the above-stated operations, the transmitter 110*a* outputting PAM-4 symbol levels may output a data eye diagram as shown in FIG. 12, wherein the size of the intermediate eye related to symbol levels +1 and −1 may be reduced.

Meanwhile, when the transmitter 110*a* outputs a signal of the symbol level +1 to the output node OUT, two enabled pull-up transistors PUB and PUC are driven and the remaining 1 pull-up transistor PUA is in the disabled state. And, in the case of outputting a signal from the symbol level −3 to the symbol level +1, since the first drive signal DRV_A is maintained at the same logic value as the first driver control signal A, the disabled pull-up transistor PUA remains in a non-operational state or a static state. When the pull-up transistor PUA in the static state may be driven instantaneously, it may be helpful to increase the size of the intermediate eye by speeding up the pull-up transition to the symbol level +1.

Similarly, when the transmitter 110*a* outputs a signal of the symbol level −1 to the output node OUT, two enabled pull-down transistors PDA and PDB are driven and the remaining one pull-down transistor PDC is in the disabled state. And, in the case of outputting a signal from the symbol level +3 to the symbol level −1, since the third drive signal DRV_C is maintained at the same logic value as the third driver control signal C, the disabled pull-down transistor PDC remains in a non-operational state or a static state. When the pull-down transistor PDC in the static state is driven instantaneously, it may be helpful to increase the size of the intermediate eye by speeding up the transition to the symbol level −1.

FIG. 7 is a block diagram of the transmitter 110*b* that detects an operation direction of the first to third driver circuits 620A, 620B, and 620C due to the driver control signals A, B, and C, e.g., pull-up or pull-down, and generates certain pull-up pulses or pull-down pulses based on the operation direction. A pull-up pulse may act as an instantaneous pull-up control signal that enables pull-up transistors in a static state in the first to third driver circuits 620A, 620B, and 620C during corresponding pulse periods, and a pull-up transistor driven by an instantaneous pull-up control signal may speed up a pull-up transition. A pull-down pulse may act as an instantaneous pull-down control signal that enables pull-down transistors in a static state in the first to third driver circuits 620A, 620B, and 620C during corresponding pulse periods, and a pull-down transistor driven by an instantaneous pull-down control signal may speed up a pull-down transition.

Referring to FIG. 7, the transmitter 110*b* is almost identical to the transmitter 110*a* of FIG. 6 except the configuration of a logic circuit 114*b*. The logic circuit 114*b* may include a first pull-up transition detector 710A, a first pull-down transition detector 720A, a first low pulse generator 730A, a first high pulse generator 740A, and a first pre-driver circuit 750A that are connected to the first driver control signal A. The first pull-up transition detector 710A may detect a negative transition of the first driver control signal A from the logic value of 1 to the logic value of 0, and the first low pulse generator 730A may generate a pulse signal having a certain low level from a negative transition edge of the first driver control signal A. The first pull-down transition detector 720A may detect a positive transition of the first driver control signal A from the logic value of 0 to the logic value of 1, and the first high pulse generator 740A may generate a first pull-down pulse signal PDN_A having a certain high level from a positive transition edge of the first driver control signal A. The first pull-down pulse signal PDN_A may be provided to a second pre-driver circuit 750B. The first pre-driver circuit 750A may receive the first driver control signal A and a second pull-up pulse signal PUP_B and generate the first drive signal DRV_A by combining the first driver control signal A and the second pull-up pulse signal PUP_B.

The logic circuit 114*b* may further include a second pull-up transition detector 710B, a second pull-down transition detector 720B, a second low pulse generator 730B, a second high pulse generator 740B, and the second pre-driver circuit 750B that are connected to the second driver control signal B. The second pull-up transition detector 710B may detect a negative transition of the second driver control signal B from the logic value of 1 to the logic value of 0, and the second low pulse generator 730B may generate the second pull-up pulse signal PUP_B having a certain low level from a negative transition edge of the second driver control signal B. The second pull-up pulse signal PUP_B may be provided to the first pre-driver circuit 750A. The second pull-down transition detector 720B may detect a positive transition of the second driver control signal B from the logic value of 0 to the logic value of 1, and the second high pulse generator 740B may generate a second pull-down pulse signal PDN_B having a certain high level from a positive transition edge of the second driver control signal B. The second pull-down pulse signal PDN_B may be provided to a third pre-driver circuit 750C. The second pre-driver circuit 750B may receive the second driver control signal B, the first pull-down pulse signal PDN_A, and a third pull-up pulse signal PUP_C and generate a second drive signal DRV_B by selectively combining the second driver control signal B with the first pull-down pulse signal PDN_A or the third pull-up pulse signal PUP_C.

The logic circuit 114*b* may further include a third pull-up transition detector 710C, a third pull-down transition detector 720C, a third low pulse generator 730C, a third high pulse generator 740C, and the third pre-driver circuit 750C that are connected to the third driver control signal C. The third pull-up transition detector 710C may detect a negative transition of the third driver control signal C from the logic value of 1 to the logic value of 0, and the third low pulse generator 730C may generate the third pull-up pulse signal PUP_C having a certain low level from a negative transition edge of the third driver control signal C. The third pull-up pulse signal PUP_C may be provided to the second pre-driver circuit 750B. The third pull-down transition detector 720C may detect a positive transition of the third driver control signal C from the logic value of 0 to the logic value of 1, and the third high pulse generator 740C may generate a pulse signal having a certain high level from a positive transition edge of the third driver control signal C. The third pre-driver circuit 750C may receive the third driver control signal C and the second pull-down pulse signal PDN_B and generate the third drive signal DRV_C by combining the third driver control signal C and the second pull-down pulse signal PDN_B.

As described with reference to FIG. 6, the output driver 116 may output PAM-4 symbol levels to the channel 130, to which the output driver 116 is connected, from the first to third driver circuits 620A, 620B, and 630C in response to the first to third drive signals DRV_A, DRV_B, and DRV_C.

Figures 8A, 8B:
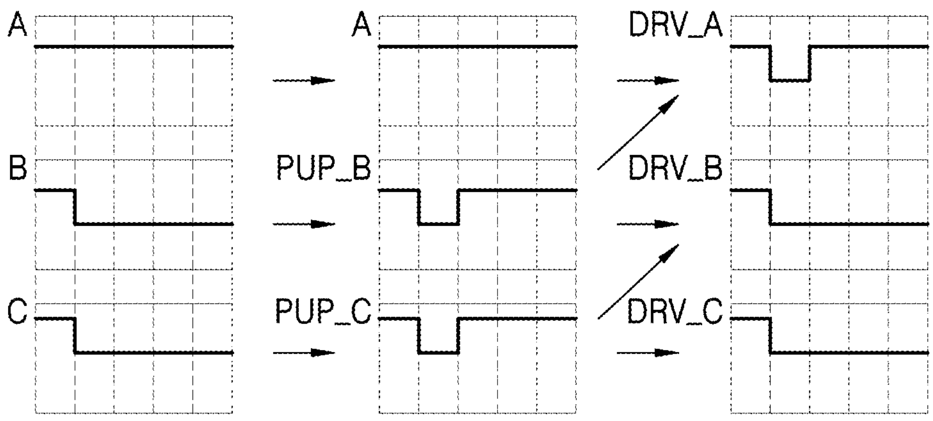
FIGS. 8A to 8C are diagrams for describing operations of a transmitter according to embodiments.
Figures 8C, 9A:
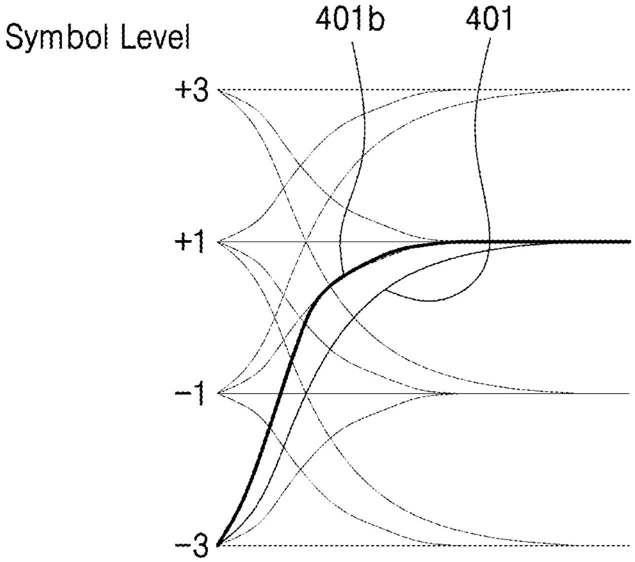
FIGS. 9A to 9C are diagrams for describing operations of a transmitter according to embodiments.

FIGS. 8A to 8C are diagrams for describing operations of a transmitter according to embodiments. FIGS. 8A and 8B show a transition operation from the symbol level −3 to the symbol level +1 in association with the encoding map 500 of FIG. 5 and the transmitter 110*b* of FIG. 7. FIG. 8C shows a signal waveform 401*b* having an improved transition speed as compared to the signal waveform 401 of FIG. 4. Referring to FIG. 8A, in a transition operation from the symbol level −3 to the symbol level +1, the logic value of the first to third driver control signals A, B, and C may be changed from 111 to 100. The first driver control signal A is maintained at the logic value of 1, and the second driver control signal B and the third driver control signal C are changed from the logic value of 1 to the logic value of 0. The logic value of 1 of the first driver control signal A may instruct the first driver circuit 620A to perform a static pull-down operation. Transitions of the second driver control signal B and the third driver control signal C from the logic value of 1 to the logic value of 0 may cause the second driver circuit 620B and the third driver circuit 620C to stop pull-down operations and start pull-up operations, respectively.

Referring to FIG. 8B, the second driver control signal B may be generated as the second pull-up pulse signal PUP_B having a certain low level by the second pull-up transition detector 710B and the second low pulse generator 730B. The second pull-up pulse signal PUP_B is provided to the first pre-driver circuit 750A, and the first pre-driver circuit 750A may generate the first drive signal DRV_A having a certain low pulse by combining the first driver control signal A and the second pull-up pulse signal PUP_B. The first driver circuit 620A may enable a pull-up transistor PUA during the low pulse period of the first drive signal DRV_A.

The third driver control signal C may be generated as the third pull-up pulse signal PUP_C having a certain low level by the third pull-up transition detector 710C and the third low pulse generator 730C. The third pull-up pulse signal PUP_C is provided to the second pre-driver circuit 750B, and the second pre-driver circuit 750B may generate the second drive signal DRV_B by combining the second driver control signal B and the third pull-up pulse signal PUP_C. At this time, since the third pull-up pulse signal PUP_C having a certain low level is the same as the second driver control signal B that has transitioned to the logic value of 0, the second drive signal DRV_B may be generated to have a waveform like that of the second driver control signal B. A pull-up transistor PUB of the second driver circuit 620B may be enabled by the second drive signal DRV_B transitioned to the logic value of 0.

The third driver control signal C is provided to the third pre-driver circuit 750C, and the third pre-driver circuit 750C may generate the third drive signal DRV_C to have a waveform like that of the third driver control signal C. A pull-up transistor PUC of the third driver circuit 620C may be enabled by the third drive signal DRV_C transitioned to the logic value of 0.

In the transmitter 110*b*, the three pull-up transistors PUA, PUB, and PUC may be enabled during the low pulse period of the first drive signal DRV_A at the time of a transition from the symbol level −3 to the symbol level +1. Advantageously, this will exhibit a faster pull-up transition than the pull-up transition to the symbol level +1 by the two pull-up transistors PUB and PUC described in the transmitter 110*a* of FIG. 6.

FIG. 8C shows the signal waveform 401 of the PAM-4 eye diagram of FIG. 4 and the signal waveform 401*b* output by the transmitter 110*b* according to an embodiment described above with reference to FIG. 7 at the time of a transition operation from the symbol level −3 to the symbol level +1. It may be seen that the transition slope of the signal waveform 401*b* appears steeper than that of the signal waveform 401 and the rise time to the target symbol level +1 is reduced.

Figure 9B:
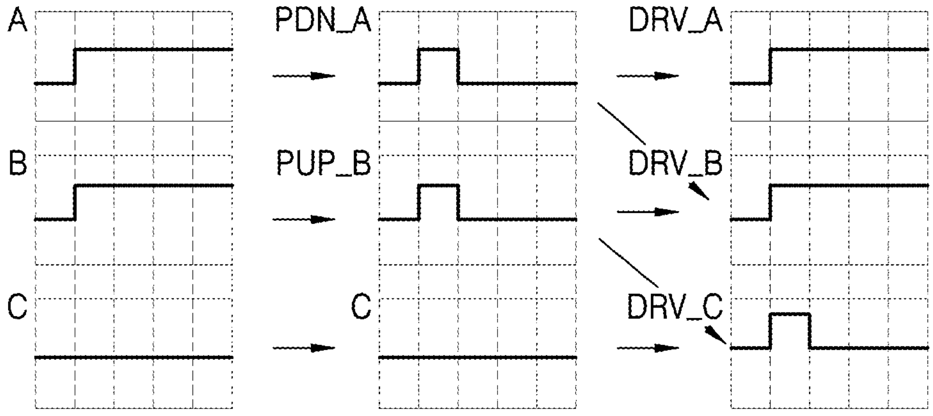
Figure 9C:
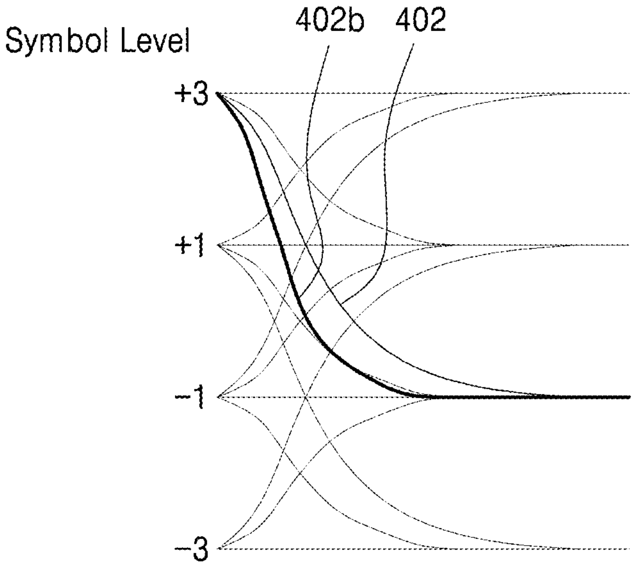

FIGS. 9A to 9C are diagrams for describing operations of a transmitter according to embodiments. FIGS. 9A and 9B show a transition operation from the symbol level +3 to the symbol level −1 in association with the encoding map 500 of FIG. 5 and the transmitter 110*b* of FIG. 7. FIG. 9C shows a signal waveform 402*b* having an improved transition speed as compared to the signal waveform 402 of FIG. 4.

Referring to FIG. 9A, in a transition operation from the symbol level +3 to the symbol level −1, the logic value of the first to third driver control signals A, B, and C may be changed from 000 to 110. The logic value of each of the first drive control signal A and the second driver control signal B are changed from the logic value of 0 to the logic value of 1, and the third driver control signal C maintains the logic value of 0. Transitions of the first driver control signal A and the second driver control signal B from the logic value of 0 to the logic value of 1 may cause the first driver circuit 620A and the second driver circuit 620B to stop pull-up operations and start pull-down operations, respectively. The logic value of 0 of the third driver control signal C may instruct the third driver circuit 620C to perform a pull-down operation without change.

Referring to FIG. 9B, the first driver control signal A is provided to the first pre-driver circuit 750A, and the first pre-driver circuit 750A may generate the first drive signal DRV_A to have a waveform like that of the first driver control signal A. A pull-down transistor PDA of the first driver circuit 620A may be enabled by the first drive signal DRV_A transitioned to the logic value of 1.

The first driver control signal A may be generated as the first pull-down pulse signal PDN_A having a certain high level by the first pull-down transition detector 720A and the first high pulse generator 740A. The first pull-down pulse signal PDN_A is provided to the second pre-driver circuit 750B, and the second pre-driver circuit 750B may generate the second drive signal DRV_B by combining the second driver control signal B and the first pull-down pulse signal PDN_A. At this time, since the first pull-down pulse signal PDN_A having a certain high level is the same as the second driver control signal B that has transitioned to the logic value of 1, the second drive signal DRV_B may be generated to have a waveform like that of the second driver control signal B. A pull-down transistor PDB of the second driver circuit 620B may be enabled by the second drive signal DRV_B transitioned to the logic value of 1.

The second driver control signal B may be generated as the second pull-down pulse signal PDN_B having a certain high level by the second pull-down transition detector 720B and the second high pulse generator 740B. The second pull-down pulse signal PDN_B is provided to the third pre-driver circuit 750C, and the third pre-driver circuit 750C may generate the third drive signal DRV_C having a certain high pulse by combining the third driver control signal C and the second pull-down pulse signal PDN_B. The third driver circuit 620C may enable a pull-down transistor PDC during the high pulse period of the third drive signal DRV_C.

In the transmitter 110*b*, the three pull-down transistors PDA, PDB, and PDC may be enabled during the high pulse period of the third drive signal DRV_C at the time of a transition from the symbol level +3 to the symbol level −1. This will exhibit a faster pull-down transition than the pull-down transition to the symbol level −1 by the two pull-down transistors PDA and PDB described in the transmitter 110*a* of FIG. 6.

FIG. 9C shows the signal waveform 402 of the PAM-4 eye diagram of FIG. 4 and the signal waveform 402*b* output by the transmitter 110*b* according to an embodiment described above with reference to FIG. 7 at the time of a transition operation from the symbol level +3 to the symbol level −1. It may be seen that the transition slope of the signal waveform 402*b* appears steeper than that of the signal waveform 402 and the fall time to the target symbol level −1 is reduced.

Figures 10A, 10B:
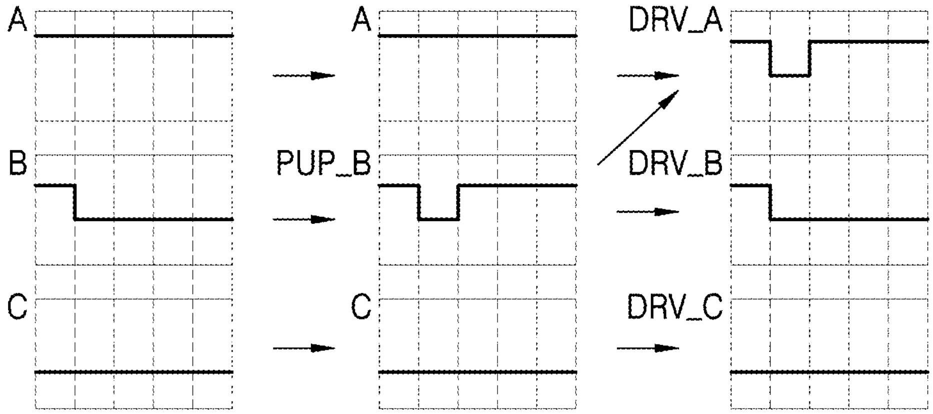
FIGS. 10A to 10C are diagrams for describing operations of a transmitter according to embodiments.
Figures 10C, 11A:
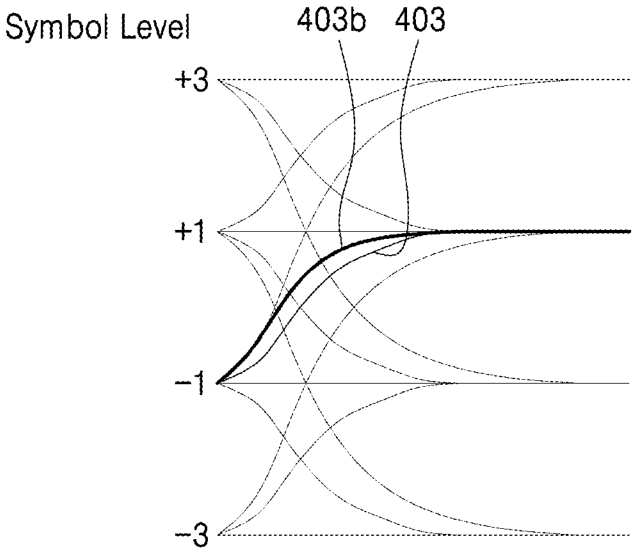
FIGS. 11A to 11C are diagrams for describing operations of a transmitter according to embodiments.

FIGS. 10A to 10C are diagrams for describing operations of a transmitter according to embodiments. FIGS. 10A and 10B show a transition operation from the symbol level −1 to the symbol level +1 in association with the encoding map 500 of FIG. 5 and the transmitter 110*b* of FIG. 7. FIG. 10C shows a signal waveform 403*b* having an improved transition speed as compared to the signal waveform 403 of FIG. 4.

Referring to FIG. 10A, in a transition operation from the symbol level −1 to the symbol level +1, the logic value of the first to third driver control signals A, B, and C may be changed from 110 to 100. The first driver control signal A is maintained at the logic value of 1, the logic value of the second driver control signal B is changed from the logic value of 1 to the logic value of 0, and the third driver control signal C is maintained at the logic value of 0. The logic value 1 of the first driver control signal A may instruct the first driver circuit 620A to perform a pull-down operation without change, and the logic value 0 of the third driver control signal C may instruct the third driver circuit 620C to perform a pull-up operation without change. Transition of the second driver control signal B from the logic value of 1 to the logic value of 0 may instruct the second driver circuit 620B to stop a pull-down operation and start a pull-up operation.

Referring to FIG. 10B, the second driver control signal B may be generated as the second pull-up pulse signal PUP_B having a certain low level by the second pull-up transition detector 710B and the second low pulse generator 730B. The second pull-up pulse signal PUP_B is provided to the first pre-driver circuit 750A, and the first pre-driver circuit 750A may generate the first drive signal DRV_A having a certain low pulse by combining the first driver control signal A and the second pull-up pulse signal PUP_B. The first driver circuit 620A may enable a pull-up transistor PUA during the low pulse period of the first drive signal DRV_A.

The second driver control signal B is provided to the second pre-driver circuit 750B, and the second pre-driver circuit 750B may generate the second drive signal DRV_B to have a waveform like that of the second driver control signal B. A pull-up transistor PUB of the second driver circuit 620B may be enabled by the second drive signal DRV_B transitioned to the logic value of 0.

The third driver control signal C is provided to the third pre-driver circuit 750C, and the third pre-driver circuit 750C may generate the third drive signal DRV_C to have a waveform like that of the third driver control signal C. A pull-up transistor PUC of the third driver circuit 620C may be enabled by the third drive signal DRV_C having the logic value of 0.

In the transmitter 110*b*, the three pull-up transistors PUA, PUB, and PUC may be enabled during the low pulse period of the first drive signal DRV_A at the time of a transition from the symbol level −1 to the symbol level +1. This will exhibit a faster pull-up transition than the pull-up transition to the symbol level +1 by the two pull-up transistors PUB and PUC described in the transmitter 110*a* of FIG. 6.

FIG. 10C shows the signal waveform 403 of the PAM-4 eye diagram of FIG. 4 and the signal waveform 403*b* output by the transmitter 110*b* according to an embodiment described above with reference to FIG. 7 at the time of a transition operation from the symbol level −1 to the symbol level +1. It may be seen that the transition slope of the signal waveform 403*b* appears steeper than that of the signal waveform 403 and the rise time to the target symbol level +1 is reduced.

Figure 11B:
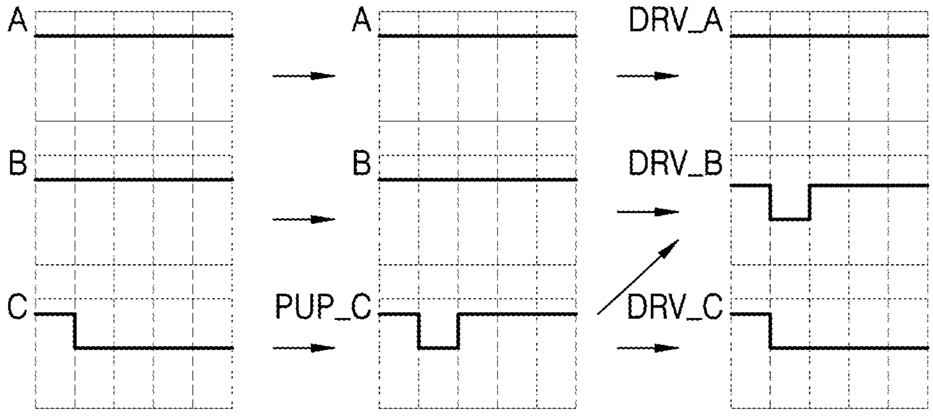
Figure 11C:
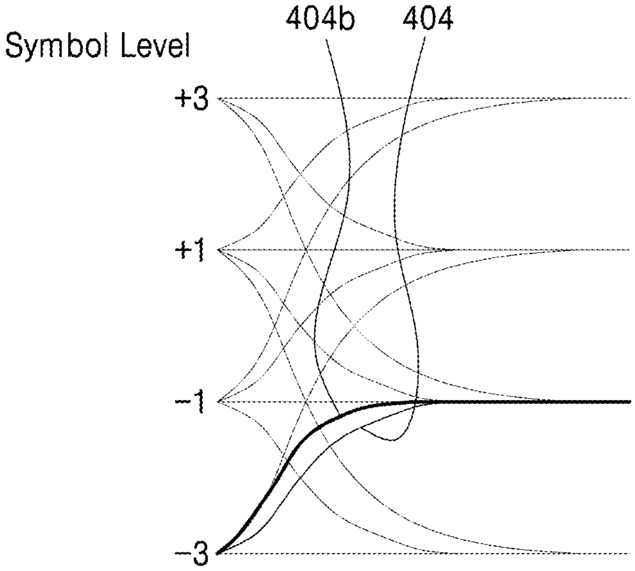

FIGS. 11A to 11C are diagrams for describing operations of a transmitter according to embodiments. FIGS. 11A and 11B show a transition operation from the symbol level −3 to the symbol level −1 in association with the encoding map 500 of FIG. 5 and the transmitter 110*b* of FIG. 7. FIG. 11C shows a signal waveform 404*b* having an improved transition speed as compared to the signal waveform 404 of FIG. 4.

Referring to FIG. 11A, in a transition operation from the symbol level −3 to the symbol level −1, the logic value of the first to third driver control signals A, B, and C may be changed from 111 to 110. The logic value of each of the first drive control signal A and the second driver control signal B are maintained at the logic value of 1, and the logic value of the third driver control signal C is changed from the logic value of 1 to the logic value of 0. The logic value of 1 of the first driver control signal A and the second driver control signal B may instruct the first driver circuit 620A and the second driver circuits 620B to perform pull-downs operation without change, respectively. Transition of the third driver control signal C from the logic value of 1 to the logic value of 0 may instruct the third driver circuit 620C to stop a pull-down operation and start a pull-up operation.

Referring to FIG. 11B, the first driver control signal A is provided to the first pre-driver circuit 750A, and the first pre-driver circuit 750A may generate the first drive signal DRV_A to have a waveform like that of the first driver control signal A. A pull-down transistor PDA of the first driver circuit 620A may be enabled by the first drive signal DRV_A transitioned to the logic value of 1.

The third driver control signal C may be generated as the third pull-up pulse signal PUP_C having a certain low level by the third pull-up transition detector 710C and the third low pulse generator 730C. The third pull-up pulse signal PUP_C is provided to the second pre-driver circuit 750B, and the second pre-driver circuit 750B may generate the second drive signal DRV_B having a certain low pulse by combining the second driver control signal B and the third pull-up pulse signal PUP_C. The second driver circuit 620B may enable the pull-up transistor PUB during the low pulse period of the second drive signal DRV_B.

The third driver control signal C is provided to the third pre-driver circuit 750C, and the third pre-driver circuit 750C may generate the third drive signal DRV_C to have a waveform like that of the third driver control signal C. A pull-up transistor PUC of the third driver circuit 620C may be enabled by the third drive signal DRV_C transitioned to the logic value of 0.

In the transmitter 110*b*, two pull-up transistors PUA and PUC may be enabled during the low pulse period of the second drive signal DRV_B at the time of a transition from the symbol level −3 to the symbol level −1. This will exhibit a faster pull-up transition than the pull-up transition to the symbol level −1 by one pull-up transistor PUC described in the transmitter 110*a* of FIG. 6.

FIG. 11C shows the signal waveform 404 of the PAM-4 eye diagram of FIG. 4 and the signal waveform 404*b* output by the transmitter 110*b* according to an embodiment described above with reference to FIG. 7 at the time of a transition operation from the symbol level −3 to the symbol level −1. It may be seen that the transition slope of the signal waveform 404*b* appears steeper than that of the signal waveform 404 and the rise time to the target symbol level −1 is reduced.

FIG. 12 is a diagram for describing PAM-4 eye diagrams according to embodiments. Referring to FIG. 12, it may be seen that, in a PAM-4 eye diagram 400*a* using the transmitter 110*a* of FIG. 6, the size of the intermediate eye shown by transition waveforms to intermediate symbol levels +1 or −1 is small, whereas, in a PAM-4 eye diagram 400*b* using the transmitter 110*b* of FIG. 7, the size of the intermediate eye has increased. According to the PAM-4 eye diagram 400*b*, the operation directions of the driver circuits 620A, 620B, and 620C by the driver control signals A, B, and C of the encoding map 500 (FIG. 5), e.g., pull-up or pull-up, may be detected and, based on the operation directions, pull-up transistors or pull-down transistors in the static state in the driver circuits 620A, 620B, and 620C may be enabled for a short pulse period to induce a fast pull-up or pull-down transition, thereby enlarging an eye.

Figure 13:
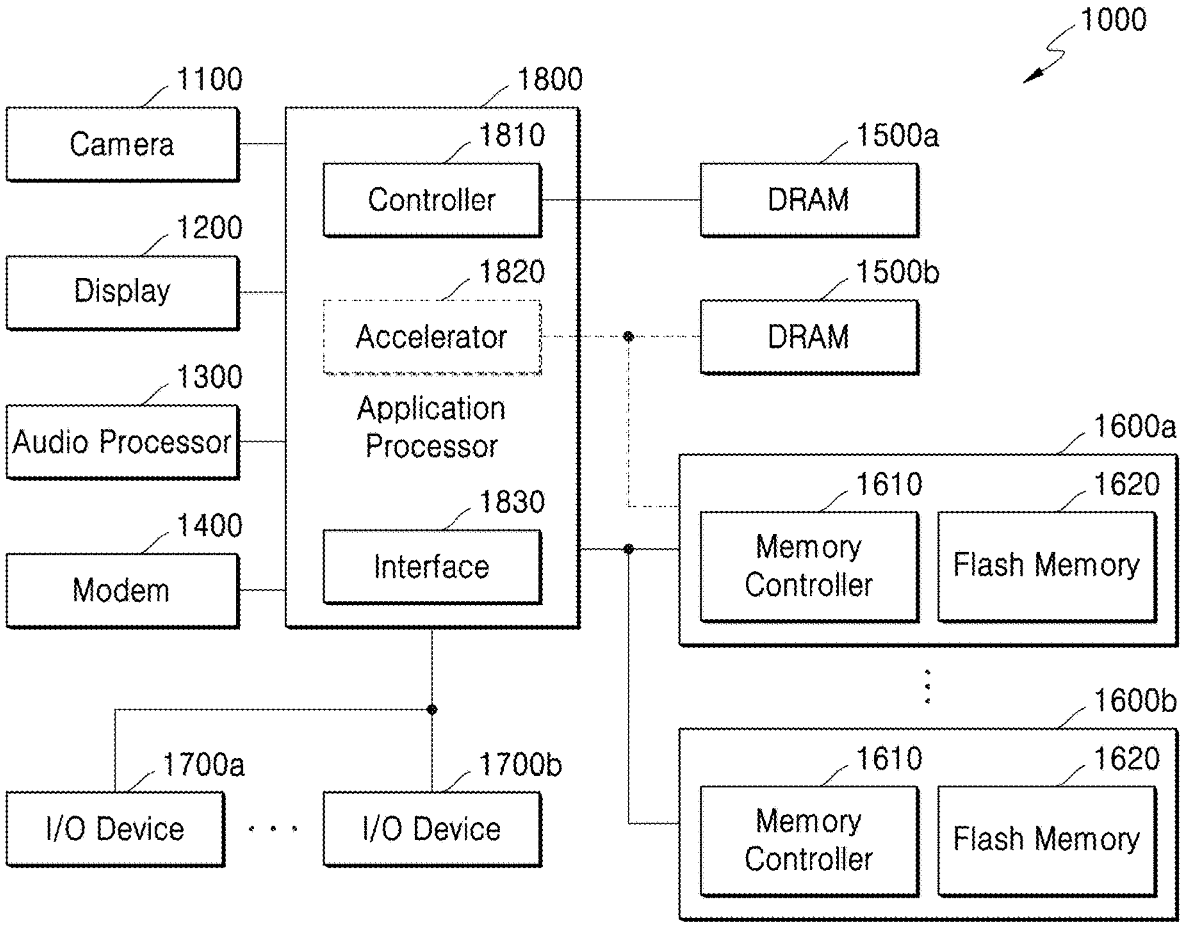
FIG. 13 is a block diagram of a system for describing an electronic device including a transmitter according to embodiments.

FIG. 13 is a block diagram of a system 1000 for describing an electronic device including a transmitter according to embodiments. Referring to FIG. 13, the system 1000 may include a camera 1100, a display 1200, an audio processor 1300, a modem (1400), DRAMs 1500*a* and 1500*b*, flash memories 1600*a* and 1600*b*, I/O devices 1700*a* and 1700*b*, and an application processor (AP) 1800. The system 1000 is implemented as a laptop computer, a mobile phone, a smartphone, a tablet personal computer (PC), a wearable device, a healthcare device, or an Internet-Of-Things (IoT) device. Also, the system 1000 may be implemented as a server or a PC.

The camera 1100 may capture a still image or a video according to a user's control and may store captured image/video data or transmit the captured image/video data to the display 1200. The audio processor 1300 may process audio data included in the flash memories 1600*a* and 1600*b* or network content. The modem 1400 may transmit a modulated signal for wired/wireless data transmission/reception to a receiver and the modulated signal may be demodulated by the receiver to restore an original signal. The I/O devices 1700*a* and 1700*b* may include devices providing a digital input function and/or digital output function, e.g., a Universal Serial Bus (USB), a storage, a digital camera, a Secure Digital (SD) card, a Digital Versatile Disc (DVD), a network adapter, a touch screen, etc.

The AP 1800 may control the overall operation of the system 1000. The AP 1800 may include a control block 1810, an accelerator block or accelerator chip 1820, and an interface block 1830. The AP 1800 may control the display 1200, such that a part of content stored in the flash memories 1600*a* and 1600*b* is displayed on the display 1200. When a user input is received through the I/O devices 1700*a* and 1700*b*, the AP 1800 may perform a control operation corresponding to the user input. The AP 1800 may include an accelerator block, which is a circuit dedicated for calculation of Artificial Intelligence (AI) data, or may include an accelerator chip 1820 separately from the AP 1800. The DRAM 1500*b* may be additionally provided in the accelerator block or the accelerator chip 1820. The accelerator block is a functional block that specializes in performing a particular function of the AP 1800 and may include a GPU, which is a functional block that specializes in processing graphic data, a neural processing unit (NPU), which is a block that specializes in AI calculation and inference, and a data processing unit (DPU), which is a block that specializes in data transmission.

The system 1000 may include a plurality of DRAMs 1500*a* and 1500*b*. The AP 1800 may set up a DRAM interface protocol and communicate with the DRAMs 1500*a* and 1500*b* to control the DRAMs 1500*a* and 1500*b* through commands complying with the Joint Electron Device Engineering Council (JEDEC) standard and mode register (MRS) setting or to use company-specific functions like low voltage/high-speed/reliability and a cyclic redundancy check (CRC)/error correction code (ECC) function. For example, the AP 1800 may communicate with the DRAM 1500*a* through an interface complying with the JEDEC standards like LPDDR4 and LPDDR5, and the accelerator block or the accelerator chip 1820 may set and use a new DRAM interface protocol to control the DRAM 1500*b* for an accelerator, which has a greater bandwidth than the DRAM 1500*a*.

Although FIG. 13 shows only the DRAMs 1500*a* and 1500*b*, the inventive concept is not limited thereto. As long as a bandwidth, a response speed, and voltage conditions of the AP 1800 or the accelerator chip 1820 are satisfied, any memory like a PRAM, an SRAM, an MRAM, an RRAM, an FRAM, or a Hybrid RAM may be used. The DRAMs 1500*a* and 1500*b* have relatively smaller latency and bandwidth than the I/O devices 1700*a* and 1700*b* or the flash memories 1600*a* and 1600*b*. The DRAMs 1500*a* and 1500*b* are initialized when the system 1000 is powered on and the OS and application data are loaded thereto, and thus the DRAMs 1500*a* and 1500*b* may be used as temporary storages for the OS and the application data or may be used as execution spaces for various software code.

In the DRAMs 1500*a* and 1500*b*, four arithmetic operations (i.e., addition, subtraction, multiplication, and division), vector calculations, address calculations, or Fast Fourier Transform (FFT) calculations may be performed. Also, in the DRAMs 1500*a* and 1500*b*, a function for an operation used for an inference may be performed. Here, the inference may be performed in a deep learning algorithm using an artificial neural network. The deep learning algorithm may include a training operation for learning a model through various data and an inference operation for recognizing data with the trained model. According to an embodiment, an image captured by a user through the camera 1100 is signal-processed and stored in the DRAM 1500*b*, and the accelerator block or accelerator chip 1820 may perform AI data calculation for recognizing data using data stored in the DRAM 1500*b* and a function used for inference.

The system 1000 may include a plurality of storages or flash memories 1600*a* and 1600*b* having a larger capacity than the DRAMs 1500*a* and 1500*b*. The accelerator block or the accelerator chip 1820 may perform a training operation and an AI data calculation using the flash memories 1600*a* and 1600*b*. According to an embodiment, the flash memories 1600*a* and 1600*b* may include a memory controller 1610 and a flash memory device 1620, and a training operation and an inference AI data calculation performed by the AP 1800 and/or the accelerator chip 1820 may be performed more efficiently by using an arithmetic unit included in the memory controller 1610. The flash memories 1600*a* and 1600*b* may store images captured through the camera 1100 or data transmitted through a data network. For example, the flash memories 1600*a* and 1600*b* may store Augmented Reality/Virtual Reality content, High Definition (HD) content, or Ultra High Definition (UHD) content.

In the system 1000, PAM-4 signals may be transmitted or received for high-speed operation between components. The camera 1100, a display 1200, the audio processor 1300, the modem 1400, the DRAMs 1500*a* and 1500*b*, the flash memories 1600*a* and 1600*b*, and the I/O devices 1700*a* and 1700*b*, and/or the AP 1800 included in the system 1000 may each include the transmitter 110*b* as described with reference to FIGS. 1 to 12. The transmitter 110*b* detects operation directions of a plurality of driver circuits, e.g., pull-up or pull-down, by a plurality of driver control signals of a PAM-4 encoding map, generates a pull-up pulse signal or a pull-down pulse signal, and applies the pull-up pulse signal or the pull-down pulse signal to a pull-up transistor or a pull-down transistor of at least one static driver circuit connected to a driver control signal that does not transition from among a plurality of driver circuits, thereby performing fast pull-up or pull-down transition. Therefore, a data eye is enlarged.

While the inventive concept has been particularly shown and described with reference to embodiments thereof, it will be understood that various changes in form and details may be made therein without departing from the spirit and scope of the following claims.

What is claimed is:

1. A method of operating a transmitting device, the method comprising:

converting a plurality of bitstreams into a plurality of driver control signals by using an encoder, wherein the plurality of driver control signals are configured to sequentially transition one-by-one with respect to the plurality of bitstreams and comprise a driver control signal that does not transition;

detecting a transition of each of the plurality of driver control signals by using a logic circuit;

generating, by using the logic circuit, a certain pulse signal from the transition of each of the plurality of driver control signals; and providing, by using the logic circuit, the pulse signal to at least one static driver circuit connected to the driver control signal that does not transition, from among a plurality of driver circuits connected to an output node of the transmitting device.

2. The method of claim 1, wherein the generating of the certain pulse signal from the transition of each of the plurality of driver control signals comprises generating the pulse signal into a pull-up pulse signal having a certain low level when each of the plurality of driver circuits performs a pull-up operation due to a negative transition of each of the plurality of driver control signals.

3. The method of claim 2, further comprising performing, by the at least one static driver circuit, the pull-up operation by the pull-up pulse signal.

4. The method of claim 1, wherein the generating of the certain pulse signal from the transition of each of the plurality of driver control signals includes generating the pulse signal into a pull-down pulse signal having a certain high level when each of the plurality of driver circuits performs a pull-down operation due to a positive transition of each of the plurality of driver control signals.

5. The method of claim 4, further comprising performing, by the at least one static driver circuit, the pull-down operation by the pull-down pulse signal.

6. A transmitting device, comprising:

an output node;

an output driver comprising a plurality of driver circuits that drive a plurality of multi-level signals onto the output node, wherein the plurality of multi-level signals are driven based on a plurality of driver control signals and drive signals for driving the plurality of driver circuits based on the plurality of driver control signals, respectively; and a logic circuit configured to detect a direction of a pull-up or pull-down operation of each of the plurality of driver circuits by transitions of the plurality of driver control signals and generate the drive signals; and wherein, in response to detecting the direction of the pull-up or the pull-down operation of each of the plurality of driver circuits, the logic circuit provides a first drive signal from among the drive signals to at least one static driver circuit corresponding to a driver control signal that does not transition having a first logic value, from among the plurality of driver circuits; and wherein the first drive signal has a second logic value different from the first logic value during a pulse period and has the first logic value after a lapse of the pulse period.

7. The transmitting device of claim 6, wherein, when the plurality of driver circuits respectively perform the pull-up operation by transitions of the plurality of driver control signals, the logic circuit generates a pulse signal as a pull-up pulse signal having a certain low level; and wherein the at least one static driver circuit performs the pull-up operation by the pull-up pulse signal.

8. The transmitting device of claim 6, wherein, when the plurality of driver circuits respectively perform the pull-down operation by transitions of the plurality of driver control signals, the logic circuit generates a pulse signal as a pull-down pulse signal having a certain high level; and wherein the at least one static driver circuit performs the pull-down operation by the pull-down pulse signal.

9. The transmitting device of claim 6, further comprising an encoder configured to generate the plurality of driver control signals for converting a bitstream to be transmitted to the output node into one of the plurality of multi-level signals.

10. The transmitting device of claim 6, wherein the logic circuit further comprises a plurality of pre-driver circuits configured to generate the drive signals based on the plurality of driver control signals.

11. The transmitting device of claim 10, wherein the logic circuit further comprises:

a transition detector configured to detect a negative transition or a positive transition of each of the plurality of driver control signals;

a low pulse generator configured to generate a first pulse signal having a certain low level from an edge of the negative transition of each of the plurality of driver control signals; and a high pulse generator configured to generate a second pulse signal having a certain high level from an edge of the positive transition of each of the plurality of driver control signals.

12. The transmitting device of claim 11, wherein each of the plurality of driver circuits comprises:

a pull-up transistor connected to a power voltage and outputting the plurality of multi-level signals onto the output node by performing the pull-up operation; and a pull-down transistor connected to a ground voltage and outputting the plurality of multi-level signals onto the output node by performing the pull-down.

13. The transmitting device of claim 12, wherein each of the plurality of driver circuits further comprises:

a first resistor connected between the pull-up transistor and the output node; and a second resistor connected between the pull-down transistor and the output node.

* * * * *